United States Patent
Ivarsson et al.

(10) Patent No.: US 12,289,138 B2
(45) Date of Patent: Apr. 29, 2025

(54) DISTRIBUTED UNIT-BASED TERMINATION OF RADIO PERFORMANCE DATA

(71) Applicant: Dell Products L.P., Round Rock, TX (US)

(72) Inventors: Tommy Ivarsson, Ottawa (CA); Sewvanda Don, Ottawa (CA); John Bradley Deforge, Chelsea (CA)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 17/659,748

(22) Filed: Apr. 19, 2022

(65) Prior Publication Data
US 2023/0336254 A1    Oct. 19, 2023

(51) Int. Cl.
*H04W 76/30*    (2018.01)
*H04B 17/15*    (2015.01)
*H04B 17/29*    (2015.01)
*H04W 48/16*    (2009.01)

(52) U.S. Cl.
CPC ............. *H04B 17/29* (2015.01); *H04B 17/15* (2015.01); *H04W 48/16* (2013.01); *H04W 76/30* (2018.02)

(58) Field of Classification Search
CPC ....... H04B 17/29; H04B 17/15; H04W 48/16; H04W 76/30; H04W 88/085; H04W 24/02
USPC .................................................. 370/329–330
See application file for complete search history.

(56) References Cited

U.S. PATENT DOCUMENTS

| | | |
|---|---|---|
| 2007/0014341 A1 | 1/2007 | Rowse et al. |
| 2009/0034487 A1 | 2/2009 | Lohr et al. |
| 2013/0030764 A1 | 1/2013 | Chatterjee et al. |

(Continued)

FOREIGN PATENT DOCUMENTS

| | | |
|---|---|---|
| KR | 10-2022-0084075 A | 6/2022 |
| KR | 10-2673083 B1 | 6/2024 |
| WO | 2022/029470 A1 | 2/2022 |

OTHER PUBLICATIONS

International Search Report and Written Opinion received for PCT Application Serial No. PCT/US2022/053288 dated Mar. 22, 2023, 14 pages.

(Continued)

*Primary Examiner* — Candal Elpenord
(74) *Attorney, Agent, or Firm* — Amin, Turocy & Watson, LLP

(57) ABSTRACT

The described technology is generally directed towards terminating performance data, obtained by a radio unit, at a distributed unit (node) coupled to the radio unit. The distributed unit coordinates with the radio unit to synchronize receiving the performance data from the radio unit. This can include communicating with the radio unit to generate the performance data at the radio unit based on processing custom signal data. The custom signal data can be generated and injected into a communications path by the distributed unit and/or the radio unit. For example, the initial custom signal data can be evaluated versus the resulting received data after transmission to determine difference data, which is indicative of performance. The performance data can be used as desired by the distributed unit, including to modify operating parameters of the radio unit to improve the current performance of the radio unit.

20 Claims, 17 Drawing Sheets

(56) References Cited

U.S. PATENT DOCUMENTS

| | | | |
|---|---|---|---|
| 2013/0148596 A1* | 6/2013 | Shin | H04W 72/1215 |
| | | | 370/329 |
| 2013/0195026 A1 | 8/2013 | Johnsson et al. | |
| 2017/0176507 A1* | 6/2017 | O'Keeffe | H04B 17/19 |
| 2018/0092044 A1 | 3/2018 | Williamson | |
| 2018/0146454 A1 | 5/2018 | Wang et al. | |
| 2019/0141738 A1 | 5/2019 | Namba | |
| 2019/0327757 A1 | 10/2019 | Oteri et al. | |
| 2019/0364492 A1 | 11/2019 | Azizi et al. | |
| 2020/0052746 A1* | 2/2020 | Nammi | H04B 7/0417 |
| 2020/0177287 A1 | 6/2020 | Yu et al. | |
| 2020/0267174 A1 | 8/2020 | Soulhi et al. | |
| 2021/0385686 A1 | 12/2021 | Ahmed et al. | |
| 2022/0272794 A1* | 8/2022 | Aftab | H04W 24/08 |
| 2023/0268967 A1* | 8/2023 | Guo | H04B 7/0617 |
| | | | 375/262 |
| 2024/0389018 A1 | 11/2024 | Sung et al. | |

OTHER PUBLICATIONS

International Search Report and Written Opinion received for PCT Application Serial No. PCT/US2022/053287 dated Mar. 29, 2023, 18 pages.

International Search Report and Written Opinion received for PCT Application Serial No. PCT/US2022/053280 dated Mar. 29, 2023, 14 pages.

International Search Report and Written Opinion received for PCT Application Serial No. PCT/U52022/053279 dated Apr. 11, 2023, 20 pages.

Kumar et al., "O-RAN Based Proactive ANR Optimization", IEEE Globecom Workshops, 2020, 4 pages.

Non-Final Office Action received for U.S. Appl. No. 17/660,333, dated Jul. 30, 2024, 46 pages.

European Office Action mailed Nov. 29, 2024 for European Patent Application No. 22851429.5, 3 pages.

Notification Concerning Transmittal of International Preliminary Report on Patentability mailed Oct. 31, 2024 for PCT Application No. PCT/US2022/053288, 9 pages.

Office Action mailed Sep. 30, 2024 for U.S. Appl. No. 17/659,741, 37 pages.

Notification Concerning Transmittal of International Preliminary Report on Patentability mailed Oct. 31, 2024 for PCT Application No. PCT/US2022/053280, 9 pages.

European Office Action mailed Nov. 26, 2024 for European Patent Application No. 22851426.1, 3 pages.

Office Action mailed Sep. 29, 2024 for U.S. Appl. No. 17/660,331, 35 pages.

Notification Concerning Transmittal of International Preliminary Report on Patentability mailed Oct. 31, 2024 for PCT Application No. PCT/US2022/053287, 12 pages.

European Office Action mailed Nov. 29, 2024 for European Patent Application No. 22851205.9, 3 pages.

Notification Concerning Transmittal of International Preliminary Report on Patentability mailed Oct. 31, 2024 for PCT Application No. PCT/US2022/053279, 13 pages.

European Office Action mailed Nov. 26, 2024 for European Patent Application No. 22854230.4, 3 pages.

Notice of Allowance received for U.S. Appl. No. 17/660,333 dated Jan. 3, 2025, 40 pages.

Notice of Allowance received for U.S. Appl. No. 17/660,333 dated Jan. 15, 2025, 7 pages.

Final Office Action received for U.S. Appl. No. 17/660,331 dated Feb. 26, 2025, 21 pages.

Final Office Action received for U.S. Appl. No. 17/659,741 dated Feb. 12, 2025, 36 pages.

* cited by examiner

DISTRIBUTED UNIT-BASED TERMINATION OF RADIO PERFORMANCE DATA

BACKGROUND

In modern wireless communications, deployment aspects and impacts of radio development engineering and system design tradeoffs have far-reaching implications into customer capital expenditures, operating expenditures, and overall completeness of enterprise radio offerings. These engineering and systems design tradeoffs result in what may be generally characterized as overall radio size, weight, thermal dissipation, reliability, complexity, and cost.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
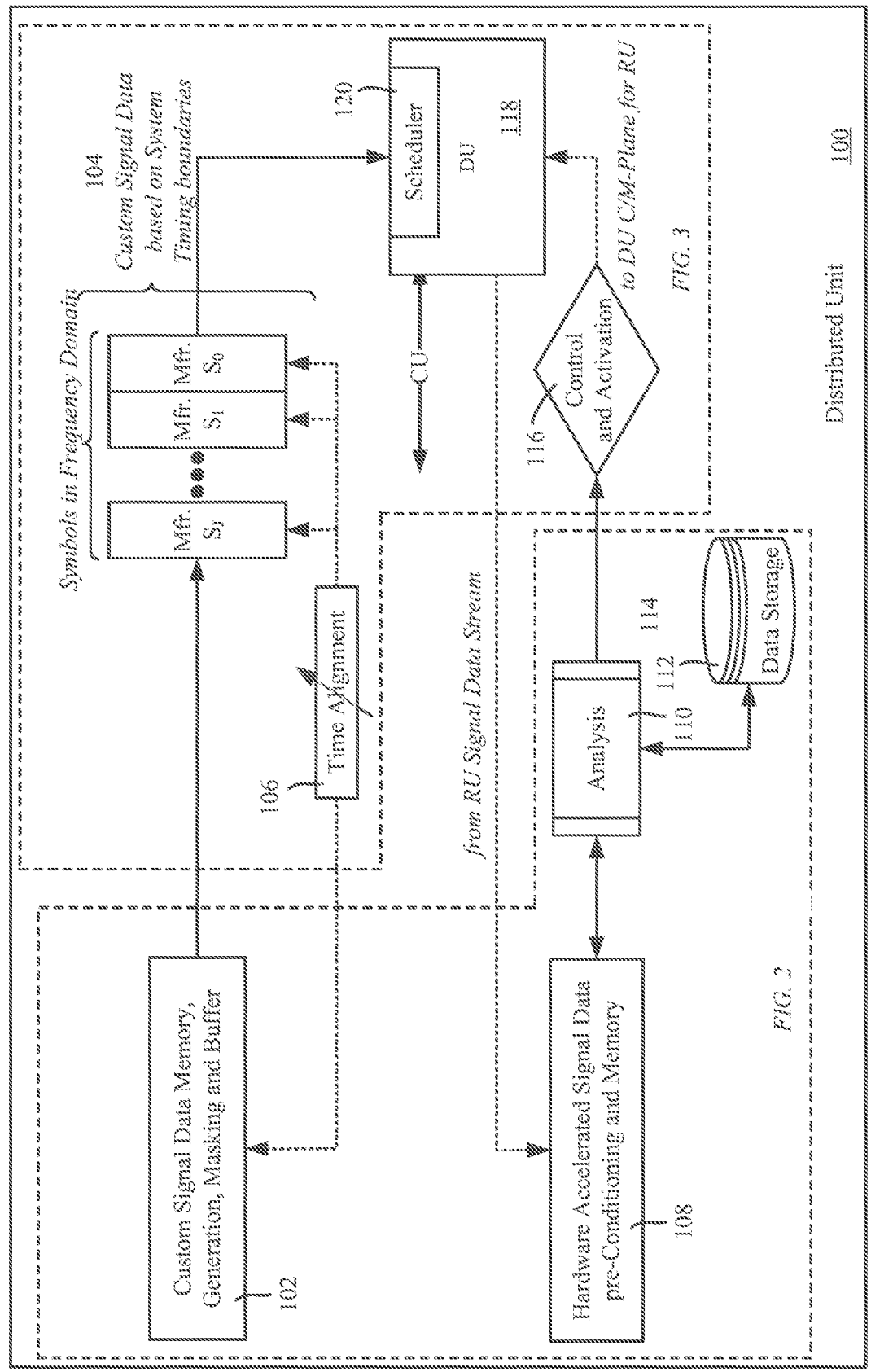
FIGS. 1-6 comprise a block diagram representation of an example system in which a distributed unit (FIGS. 1-3) terminates performance-related data received from a radio unit (FIGS. 4-6), in accordance with various aspects and embodiments of the subject disclosure.

Various aspects of the technology described herein are generally directed towards terminating radio unit performance data received at a distributed unit, in which the performance data is captured by a radio unit based on custom signals/data. The technology leverages the ability generate customized data and inject the customized data into the signal chain. The injection of customized data facilitates the deriving of performance data from radio subsystems, e.g., a radio unit. As one non-limiting usage example, the performance data received from a radio unit can be analyzed, and following analysis, the radio unit's operating parameters be modified for the benefit of a customer, e.g., to improve radio performance, conserve power and/or the like.

In general, based on custom data injected into a communications path, the technology described herein collects, synchronizes and/or analyzes returned data, such as power data, in the time and/or frequency domain of a radio system. Radio system reliability, serviceability and manageability can thus be improved, both from the perspective of the radio unit user and the provider of the radio unit and/or the distributed unit coupled thereto. The knowledge, information and data/metadata gained from tracking, collecting, mapping and analyzing performance of a radio system can provide numerous benefits.

Modern cellular systems have continued to advance, to a point where dynamic changes can be made to improve one or more aspects and/or to provide one or more new services and/or other aspects. These dynamic changes can benefit from knowledge, information and/or data regarding how a system is functioning, system issues, troubleshooting performance and/or adjustments made to address functions and/or issues. That is, such knowledge, information and/or data relative to hardware, firmware and/or software can be useful in proactively addressing such issues, performing troubleshooting, and overall, improving one or more systems, and/or subsystems of such cellular systems, such as of related radio systems. Collecting of such knowledge, information and/or data is thus highly useful, and the more detailed the knowledge, information and/or data, the more useful it is to the collector.

The data collected based on the custom injected signals, and/or the results of analysis of the collected data can allow for real-time, immediate, short term and/or long term improvements. In addition to real-time or near real-time modification of a radio unit's operating parameters to improve performance of the radio unit, actions such as troubleshooting and/or predictive modeling can be performed with respect to radio system performance, failures, issues, continuity and/or other aspects. For example, the resulting "clean" and/or statistically accumulated data, such as telemetry, radio frequency (e.g., analog data) and/or digital performance and/or comparative data, and/or underlying infrastructure utilization statistics can be used to improve network performance, plan network capacity, and/or identify new service opportunities, relative to the radio system. Various types of data can be collected, such as, but not limited to, data represented in a frequency domain (FD) and data represented in a time domain (TD).

It also should be noted that terms used herein, such as "optimize," "optimization," "optimal" and the like only represent objectives to move towards a more optimal state, rather than necessarily obtaining ideal results. For example, "optimizing" a network/system/cell means moving towards a more optimal state, rather than necessarily achieving an optimal result. Similarly, "maximize", such as to "maximize throughput" means moving towards a maximal state, not necessarily achieving such a state.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The technology described herein provides creation, timing, synchronization, injection, and capture of performance data based on custom (signal) data. Somewhat analogous to custom waveforms obtained from a signal generator, custom signal injection as described herein can be added to (e.g., interleaved with) live-air (sometimes referred to as mission mode) signals/traffic, some non-live-air (sometimes referred to as non-mission mode) signals/traffic, or a hybrid of live-air signals and custom signals), which can be independent of live-air signals.

Among other benefits, the use of custom signals facilitates measurement and analysis of radio performance of a radio unit (RU), which can be returned as data to a distributed unit (DU) via the uplink path, which terminates the captured and returned data in some way. For example, the distributed unit may process, analyze and/or store data received from the radio unit, (not necessarily stored in the same format as received).

For example, the custom signal data is known to either the distributed unit, the radio unit, or known to both. This source custom signal data can be considered clean data. When injected into communications path (downlink or uplink) and transmitted, the resulting transmitted data can be received and evaluated against the clean data to determine, based on difference data, how the radio unit is currently performing. The performance data is terminated at the distributed unit for use as desired by the distributed unit, which can include analyzing the data to modify the performance of the radio unit.

Indeed, with the captured data terminated at the distributed unit, the distributed unit possesses ability to capture, analyze, store and recall radio unit performance data to/from a database or other storage facility for the purpose of analysis and determination of radio performance. For example, the distributed unit may collect, transfer (e.g., to a centralized unit or other analysis destination), combine and otherwise use the radio unit data from one or more radio units as desired. The distributed unit thus may transmit (but is not limited to) the data to the centralized unit and/or other central data store/entity for future uses; (thus the term "terminated" does not mean that the captured data remains at the distributed unit, but only that the distributed unit obtains the captured data and can manage/control captured data as desired thereafter; it is also feasible for an instance or the like of the captured data to be terminated at another entity in addition to the distributed unit).

For example, as a result of distributed unit and radio unit interaction, capturing data can enhance a device manufacturer/vendor with respect to pursuit of features and enhancements for a device manufacturer/vendor's distributed unit and/or radio unit offerings. Captured data may be used for the purposes of enhancing a device manufacturer/vendor's ability to self-test and characterize system performance both in the factory and in the field.

In one implementation, the distributed unit may originate and prepare (inject) custom data to be transferred to the radio unit via the downlink path. In another implementation, the radio unit may originate and prepare (inject) custom data to be transferred to the distributed unit via the uplink path. It is also feasible for both the distributed unit and the radio unit to originate and prepare custom data, e.g., at different times for different purposes. Thus, the distributed unit may or may not have any a priori knowledge of the custom data used to create the performance data.

In some examples, with regard to originating custom data and to analyzing a radio (e.g., via hardware acceleration), knowing the source signal (e.g., data) in advance can be used to determine performance based on the injected signal. That is, there can be a case where input data is not captured in the system, but is known to the system. In such a case, a derivation of performance based on the pre-selected captured data can be compared in memory to the original data (rather than captured data), where the original data is determined based on a memory comparison rather than a capture. This approach can save computing resources relative to capturing the input data.

In general and as described herein, coordination exists between the distributed unit and (a sufficiently configured) radio unit for time alignment and/or time stamping of data, which can include sequence-based coordination, e.g., according to a pattern understood/a agreed to by the distributed unit and radio unit. A distributed unit scheduler can have knowledge of signal data transmitted to radio unit, and in one example, such a signal can be a reference signal, which can be customized for a relatively deeper evaluation of radio performance compared to simple reference signal reporting. A distributed unit also may communicate and message the radio unit, such as to control/modify operating parameters of the radio unit to improve radio unit performance based on the captured and returned performance data.

Thus, in one non-limiting example scenario, the distributed unit can specify and communicate a test case that activates a particular state of a radio unit's internal tap and loopback mechanisms. In an alternate non-limiting example scenario, the radio unit has knowledge of a reference signal and timing data, and autonomously configures the radio unit for a radio performance test during the presence of the reference signal. In an alternate non-limiting example instance, a radio unit captures data based on performance of the radio in the presences of a reference signal.

In general, the distributed unit communicates with radio unit to route the tapped data back to distributed unit. The distributed unit may advantageously make use of lesser utilized uplink path resources to import the performance data from the radio unit.

With the captured data reported to and terminated at the distributed unit, the distributed unit may determine a new state of radio performance and compel (or suggest that) the radio unit to activate this new state. The radio unit may reconfigure key performance parameters to optimize based on (but not limited to) messaging from the distributed unit.

In one or more example instances, the distributed unit may pre-select, pre-condition and/or hardware accelerate the analysis of the data to ensure the real time or near real time activations that may be performed on the radio to adjust radio's operational parameters for optimization. The distributed unit may apply statistical counters to the data. The distributed unit may analyze data and generate control information to be applied by the radio unit and sent to the radio unit via control plane and/or management plane (M-Plane) messaging. In an exemplary case the message received by the radio unit may be used to modify the system performance of the radio unit.

Further, one enterprise's distributed unit may interwork with other enterprises', third-party radio units radio units. For example, the distributed unit can opportunistically communicate radio performance improvement through messaging. Opportunistic in this context can refer to case(s) in which the distributed unit may, possibly without formal ORAN standardization, communicate with a sufficiently sophisticated or configured radio unit (that understands the intent of the communications) to effect a change therein.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 2:
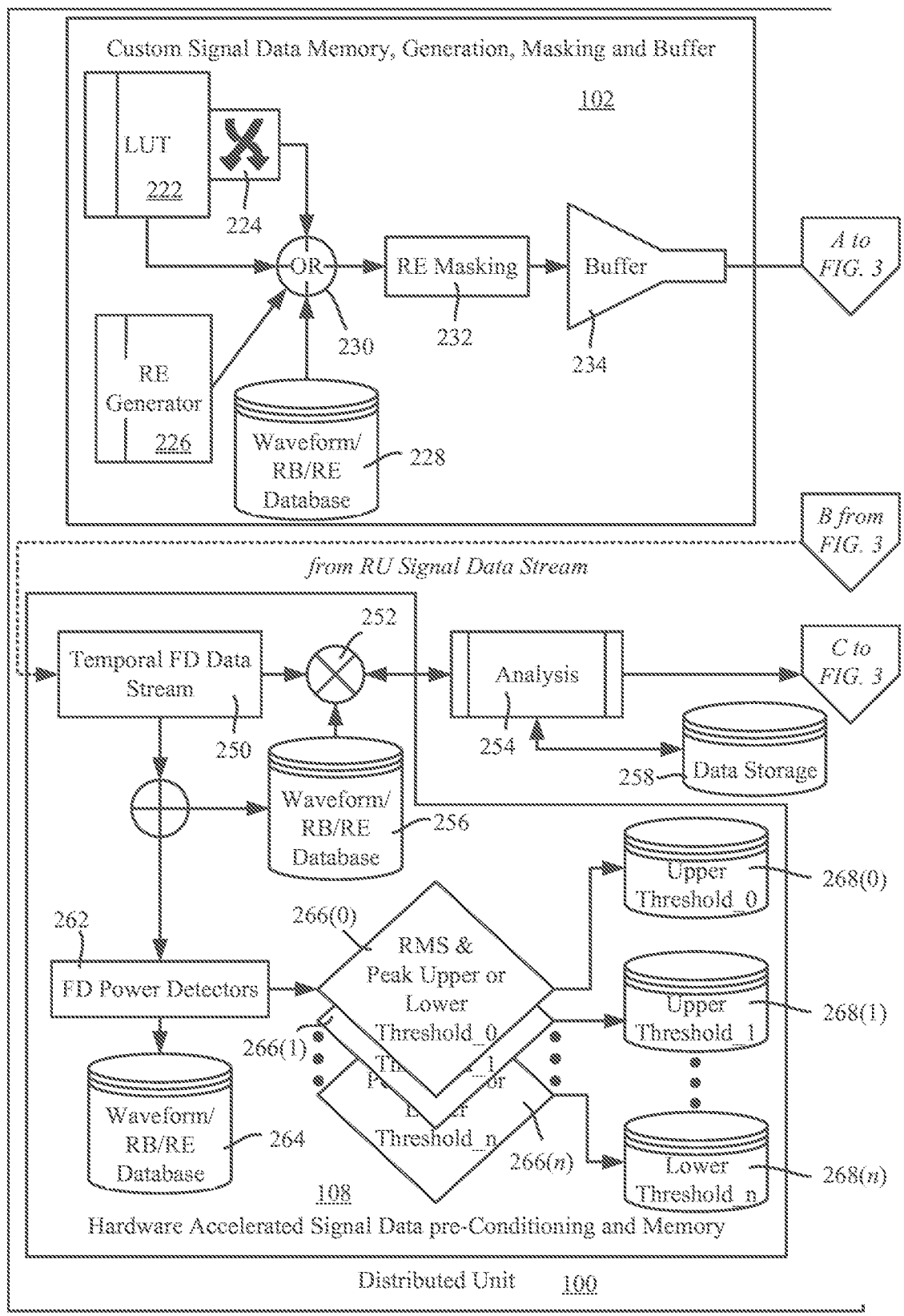
Figure 3:
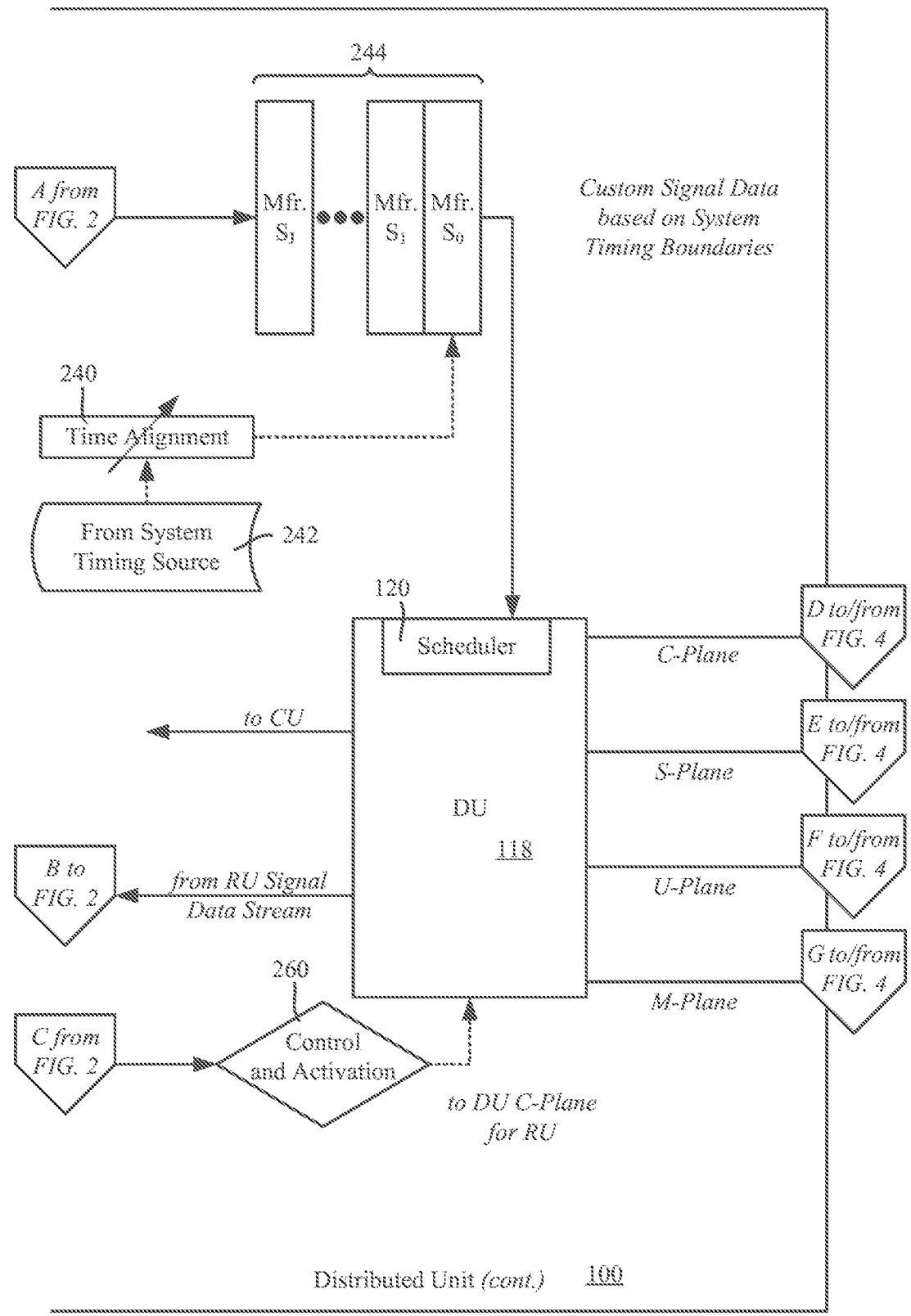
Figure 4:
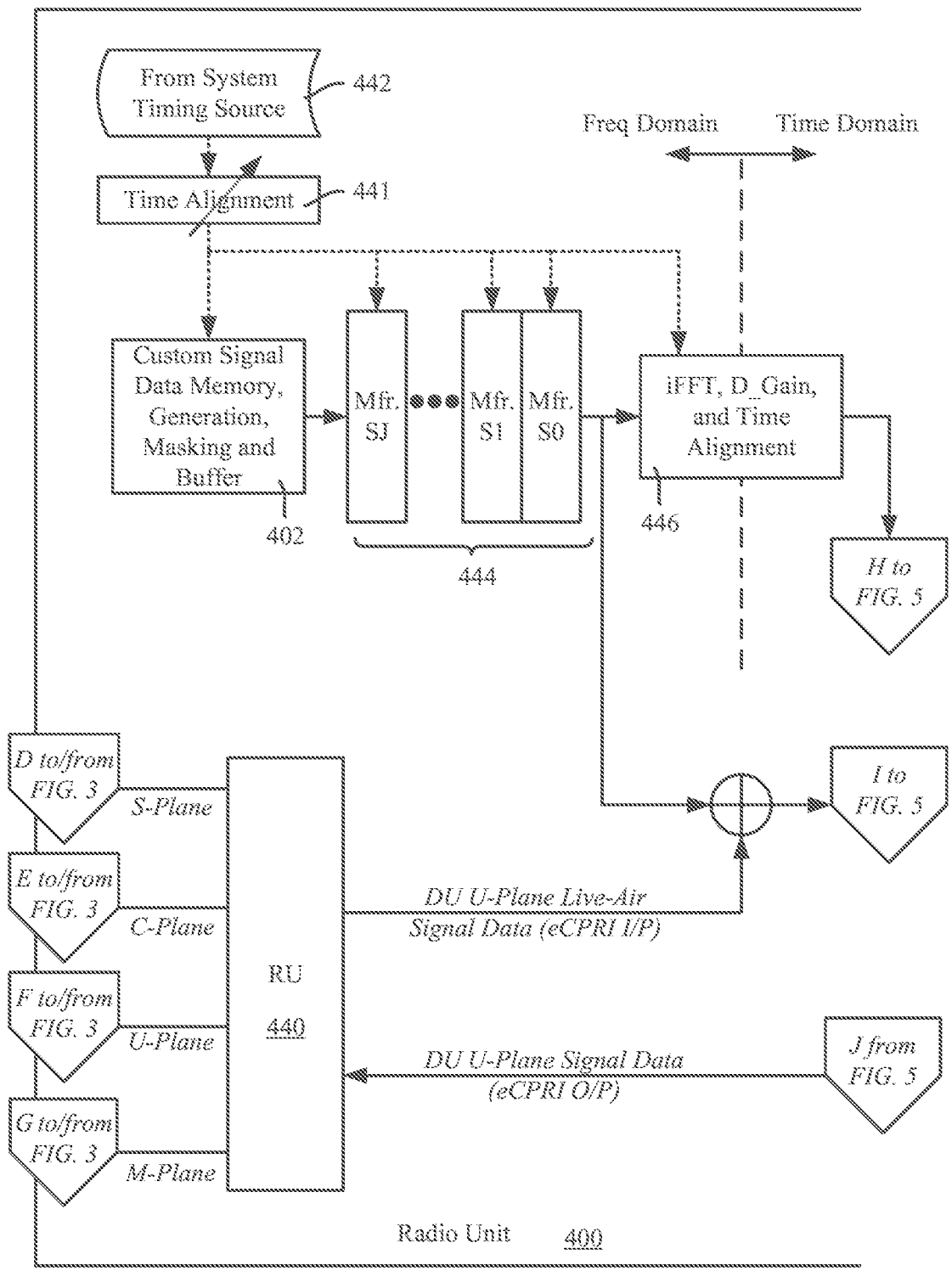
Figure 5:
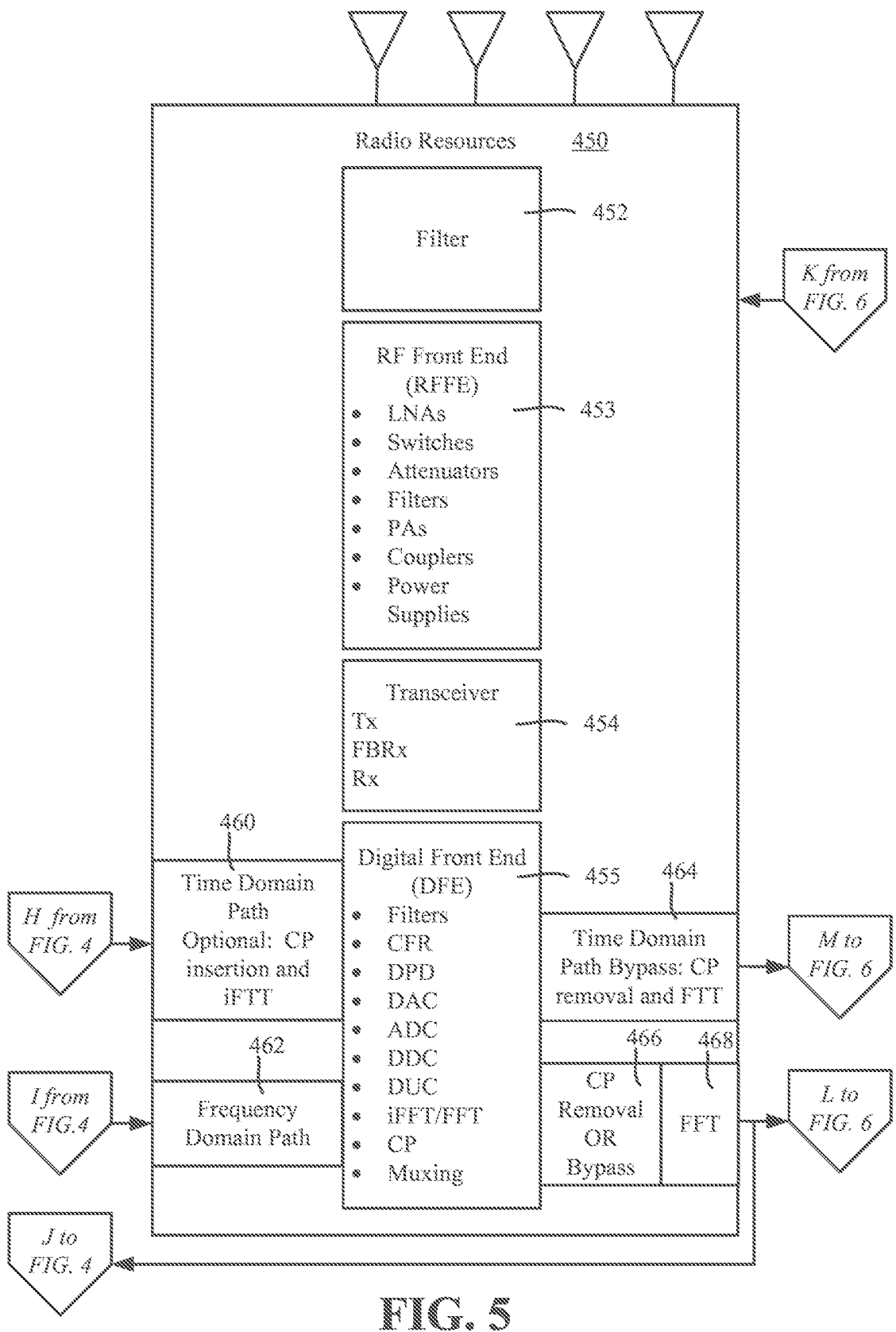
Figure 6:
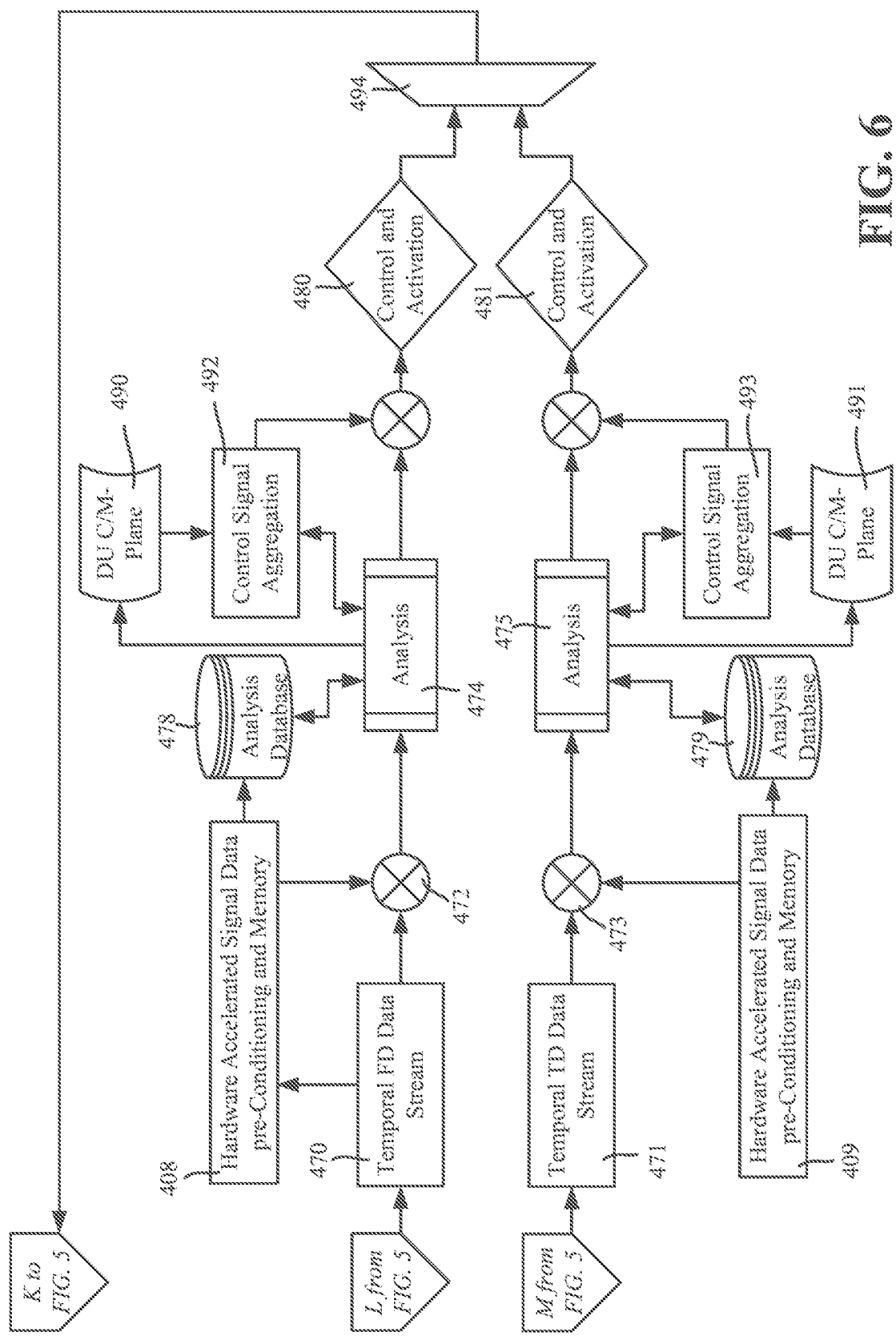

FIGS. 1-6 illustrate an example system architecture for a radio system including a distributed unit (DU) 100 (FIGS. 1-3) coupled to a radio unit (RU) 300 (FIGS. 4-6). As will be understood, the radio system can facilitate injecting custom data into a radio system's signal chain, which as described herein can be used to obtain radio performance data of the radio unit 300 (FIG. 3). As described herein, the custom data can be captured at any of various "tap" points in the signal chain (FIGS. 7 and 8); however regardless of where the custom data is captured, the performance data derived based on the custom data can be terminated at the distributed unit 100 (FIGS. 1-3) in accordance with one or more implementations described herein. Although not explicitly shown in FIGS. 1-6, the technology described herein can be applied to coverage for all antenna branches.

Custom data can be injected at any tap point along a system's signal chain in a downlink, feedback, or uplink path. Data can pass through one or multiple digital front end blocks. Data can pass to an analog portion of a radio's signal chain. Multiple injection and capture paths can exist where a multiplicity of signal data can be introduced at different tap points, which can include different antenna branches, simultaneously.

FIG. 1 shows a generalized overview of the components of the distributed unit 100, with FIGS. 2 and 3 providing additional details of the components. In FIG. 1, block 102 represents custom signal data generation memory, generation, masking and buffer components that perform O-DU and O-RU signal generation as further detailed in FIGS. 2 and 3, (where "O-" represents ORAN, or open radio access network). The custom signal data 104 can provide local synchronized (time-aligned, block 106) custom and live-air (mission mode) traffic, which can cause a stimulus with known characteristics via symbols in the frequency domain.

Block 108 of FIG. 1 represents hardware accelerated signal data pre-conditioning and memory components, which perform frequency domain signal data detection and binning, as described in more detail with reference to FIG. 2. In general, the information from a radio unit signal data stream is received at block 108, which is coupled to an analysis component 110, which in turn is coupled to a database 112. Signal capture data analysis by the analysis component 110 can include algorithms, and/or a machine learning and/or artificial intelligence (ML/AI) agent with training (both live and stored real time, and statistical data) to provide an output/response (access to actuators).

The analysis component 110 output is able to be used for control and/or activation (block 116), which inputs augmented information available to the ML/AI agent, for example to affect output of actuators. A DU portion 118 comprising a scheduler 120 facilitates the sending of such control and/or activation-related data to the radio unit 400 (FIG. 4), e.g., via control plane (C-Plane) and/or management plane (M-Plane) communications. Note that as known in new radio, the DU portion 118 is also communicatively coupled to a centralized unit (CU), not explicitly shown.

FIGS. 2 and 3 depict the example components of the distributed unit 100 in more detail. As shown in FIG. 2, the custom signal data generation memory, generation, masking and buffer components 102 comprise data/signal sources including a lookup table (LUT) 222, a pseudo-random lookup table generator 224, a resource element (RE) generator 226 and a memory, shown as a waveform resource block (RB)/RE database 108. The example components 102 further include an OR gate 230, which allows any of the data/signal sources 222, 224, 226 and/or 228 to provide the data/signals. Also shown as part of the example components 102 are an RE masking component 232, and a component 234, which can comprise a buffer, for created RB/RE data from the data/signal sources.

For example, the lookup table 222 can be configured to store predetermined inphase and quadrature (I/Q or I+Q) data values, which are each able to represent a component of a constellation of a given modulation coding scheme (MCS) level. Data of the lookup table 222 data can be played in order, or randomized to be playable in any order. In some examples, a lookup table can fulfill a given constellation/MCS symbol map and a predetermined complementary cumulative distribution function (CCDF). A signal from a lookup table can be a one-tone signal or a multi-tone signal.

The pseudo-random lookup table generator 224 can operate in conjunction with the lookup table 222. The pseudo-random lookup table generator 224 can comprise a block that operates on the lookup table's I/Q data and produces a pseudo-random symbol of data values of suitable random distribution. Values can be selected from the lookup table in a random fashion to fulfill a symbol (e.g., a complete RB matrix) of signal data.

Regarding dimensioning, one I+Q data value can be equivalent to one resource element/sub-carrier in a frequency domain. In an example, there can be up to 4,096 resource elements of I+Q, up to N bits (signed data pairs), where, for example N can equal sixteen. In an example, data generated for a radio unit can support masking so that all, or a subset, of the 0 to 4,095 resource elements available can either be passed to, or removed from, a data stream via an AND/OR block. In some examples, a mask can be enabled or disabled, where a disabled mask is a pass-through state.

MCSes can be available as supported by radio requirements. Data can be triggered and time-aligned with system timing on a symbol-by-symbol basis. In some examples, data can be triggered and time-aligned based on other relevant system time boundaries.

In some examples, data AND/OR blocks can be implemented for selecting a source of data. The distributed unit 100 can provision one resource, or a plurality of resources, of signal data available to radio unit sourced signal data for injection of custom data. Data can be sourced purely from a distributed unit live-air traffic U-plane path source (that is, the data can be live-air traffic data).

As described with reference to FIG. 4, data can be sourced purely from sources (block 402) internal to a radio unit, and injected into the user plane (U-plane) data path; (that is, the data can be non-live-air traffic data). As in FIG. 2, such radio unit sources 402 can include a memory, a dynamic RB/RE generator, a lookup table, and/or a pseudo-random lookup table, with or without a mask enabled. Data can be sourced from a combination of both sources for a distributed unit and radio unit U-plane; (that is, the data can be a hybrid of live-air traffic data and non-live-air traffic data).

In some examples, pure live-air traffic signal data, hybrid custom and live-air traffic signal data, and full custom data can be generated on the distributed unit 100 alone. In some examples, a radio unit such as the radio unit 400 can pass live-air traffic data unmodified (e.g., pure live-air traffic data), can manufacture a custom hybrid data of custom and live-air traffic data, and can provide full custom data. That is, in examples, data (be it pure, hybrid, or full-custom) can be solely originated by the radio unit, or solely originated by the distributed unit, or both at different times/for different purposes. In some examples, a combination of live-traffic data from a distributed unit and hybrid-custom data from a radio unit can be originated.

Thus, custom data (which can sometimes be referred to as a value, or a signal or a waveform when viewed over a time period) according to the technology described herein can be originated in several ways, including via the data/signal sources 222, 224, 226 and/or 228 of the distributed unit (or similar sources in the radio unit). For example, the memory/waveform database 228 can be configured to temporally play a suitable waveform or noise-like signal; a dynamic resource block (RB)/resource element (RE) allocation can be configured to, in some examples generate between 1 and 4,096 (or other) inphase and quadrature (I+Q, or I/Q) up to N-bit (signed) data pairs of arbitrary sub-carrier values for a given desired modulation coding scheme (MCS). Such a dynamic RB/RE allocation can be operated as a Moore machine or a Mealy machine.

As shown in FIG. 3 via the continued components of the distributed unit 100, a time alignment component 240, coupled to system timing source 242, aligns the custom data based on system timing boundaries for output via a buffer 244; ("Mfr." represents that manufacturer/entity that owns/builds and/or operates the distributed unit, and possibly also can be the manufacturer of the radio unit). The DU portion 118 of the distributed unit comprising a scheduler 120 is shown as in FIG. 1; the DU portion 118 returns information from the radio unit signal data stream, wherein the information is based on the custom data.

The buffer 244 can ensure time alignment of the custom signal. The buffer 244 can buffer (or trigger or gate) the custom signal until determining an appropriate system time (based on time alignment 240) to release custom signal forward in the signal chain. Time alignment 240 can use system timing of a logic device to advance or slow gating of a data stream. In some examples, this can be an ON/OFF. On other examples, this can operate as a more complex timing/gating pulse where data presence or absence can follow other system timing triggers, such as time-division duplexing (TDD) downlink/uplink and guard period timing, power amplifier on or off (PA_ON/OFF), symbol start/stop markers, blanking, and so forth. By selectively masking a portion of the signal via block 232, the buffer 244 can create a resource block or resource element from the masked signal, and time alignment 240 can time align the resulting signal to a system time boundary of the radio unit. Note that such buffering and time alignment also can apply to operations at the radio unit 400, as described with reference to FIG. 4.

Returning to FIG. 2, the information from the radio unit signal data stream is received by the hardware accelerated signal data pre-conditioning and memory components 108 at a temporal frequency domain (FD) data stream component 250, which is coupled to AND gate 252, and in turn coupled to an analysis component 254. Also providing input to the AND gate 252 is data from a waveform/RB/RE database 256. In this way, for example, both the original custom data and the source data can be analyzed together with respect to one another. Output from the analysis component 254 can be maintained in data storage 258, and, as shown in FIG. 3, can be used for control and/or activation (block 160) purposes to the DU portion 118, e.g., via the control plane and/or management" plane (C/M-Plane) for communicating to the radio unit 400 (FIG. 4; in FIG. 4, an RU communication portion 440 is shown for S-Plane (synchronization plane), C-Plane, U-Plane (user plane) and M-Plane (management plane) communications with the distributed unit 100).

Returning to FIG. 2, the temporal FD data stream 250 can also be input to FD power detectors 262, (as also described with reference to FIG. 8). The power detectors 262 can output data for maintaining in a data structure 264, e.g., for later processing, and data with respect to RMS threshold detection (from peak upper to lower thresholds, blocks 266(0)-266(n)) and 268(0)-268(n)) and/or other processing.

The distributed unit 100 need not generate (or access if already generated) and/or inject the custom data into the communications downlink path. Rather, the radio unit 400 can generate/access and inject the custom data in communications path, in time slots scheduled by the distributed unit 100/scheduler 120. It is also feasible to have a system in which both the distributed unit 100 and the radio unit 400 generate and inject the custom data at coordinated times. For example, a radio unit can be configured with certain test and performance measurement operations, and/or other (e.g., antenna calibration) operations, each of which correspond to the radio unit generating (or accessing if already generated) and injecting certain custom data to perform; at coordinated times, the distributed unit 100 can generate and inject different custom data to have the radio unit perform different operations. In any event, as described herein in one implementation the radio performance data or other resulting data is terminated at distributed unit, e.g., for analysis, storage, and so forth.

Thus, because the radio unit 400 can, instead of or in addition to injection of custom data by the distributed unit 100, FIGS. 4 and 5 depict example components of the radio unit 400 comprising similar data/signal sources (block 402). More particularly, block 402 represents custom signal data, memory, generation, masking, and buffer components. As in the distributed unit custom signal generation (FIGS. 2 and 3), radio unit custom signal generation includes time alignment 441 and a timing source 442, which time-aligns the custom data based on system timing boundaries for the buffer 444; ("Mfr." represents that manufacturer/entity that built and/or operates the radio unit, and possibly also can be the manufacturer of the distributed unit). Such radio unit-injected frequency domain and/or time domain custom data can provide a stimulus with known characteristics, which can be coordinated for live-air signal data synchronization based time alignment, and for example, can result in data forwarding for analysis.

FIG. 4 also shows the time alignment component 441 coupled to an inverse Fast Fourier Transform (iFFT) 446. The iFFT 446 is coupled to the buffer 444 of custom data, and also can perform delta gain, time alignment, and optional cyclic prefix (CP) insertion on the custom data.

FIG. 5 shows other radio unit resources 450 including a filter 452, radio frequency (RF) front end (RFFE) 453 (which can include low noise amplifiers (LNAs), switches, attenuators, filters, PAs, couplers, and power supplies), transceiver 454 (which can include Tx, FBRx, and Rx), and digital front end (DFE) 455 (which can include filters, CFR (crest factor reduction), DPD (digital pre-distortion), a digital-to-analog converter (DACs), an analog-to-digital converter (ADC), a digital down converter(s) (DDC), a digital up converter(s) (DUC), an iFFT/FFT, CP, and multiplexing (muxing)). Other elements in the DFE 455 can include tap points (FIGS. 7 and 8), power detectors, signal generators, hardware accelerated preconditioning, and pre-processing of the signal data. An example power detector can include/perform hardware accelerated preconditioning, time domain triggering, gating, masking and markers, frequency domain subcarrier selection and masking, pre-processing, statistical counters/accumulators, threshold detection, binning, can start/pause/stop data collection, can perform data pruning. Such a power detector can have the ability to use hardware accelerated pre-conditioned in real time with analysis and actuator blocks with minimal or substantially reduced post processing.

Further depicted in FIG. 5 are time domain path 460 (also for optional CP_injections and iFFT), and frequency domain path 462 coupled as inputs to the DFE. At the output, time domain path 464 (which can bypass CP removal and FFT), CP removal or bypass 466, and FFT 468 are shown.

Similar to the distributed unit components of FIG. 1, including frequency domain components (even numbers starting at 470) but further depicting some time domain (TD) components (odd numbers starting at 471, which could be similarly incorporated into the distributed unit 100), FIG. 6 shows additional radio unit components, including hardware accelerated signal data pre-conditioning and memory components/functions 408 and 409. The components/functions 408 and 409 facilitate O-RU local frequency domain (FD) signal data capture and storage and O-RU local time domain (TD) signal data capture and storage, respectively.

As shown in FIG. 6, the temporal FD data stream 470 and hardware accelerated signal data pre-conditioning and memory components/functions 408 are coupled via gate 472 to an analysis component 474, which is coupled to an analysis database 478. FD signal data detection can include or be coupled to binning and storage. The temporal TD data stream 471 and hardware accelerated signal data pre-conditioning and memory components/functions 409 are coupled via gate 473 to an analysis component 475 which is coupled to an analysis database 479. Time domain signal data detection can include or be coupled to binning and storage. The hardware accelerated signal data pre-conditioning and memory components/functions 408 and 409 are respectively coupled to the analysis databases 478 and 479.

The signal capture data analysis can include algorithms, an ML and/or AI agent with training (both live and stored real time, and statistical data) that provide an output/response via access to actuators. To this end, based on data/results of the respective analyses, the analysis components 474 and 475 can communicate with the distributed unit 100 via the C-plane and/or M-plane (blocks 490 and 491, respectively) and with control signal aggregation (blocks 492 and 493, respectively, which are also coupled to the DU C-Plane control data blocks 490 and 491). The control signal aggregation blocks 492 and 493 can input augmented information, e.g., available to ML/AI agent, to affect the output of actuators. That is, data based on the results of the analyses, which can be streamed or taken from storage, and control signal aggregation can be used for control and activation purposes, via respective blocks 480 and 481. With respect to actuator aggregation, the control and activation output (blocks 480 and 481) can be collected and returned (block 494) to the radio resources 450 (FIG. 5) for use, e.g., in modifying radio operation/affect the radio and radio performance.

Figure 7:
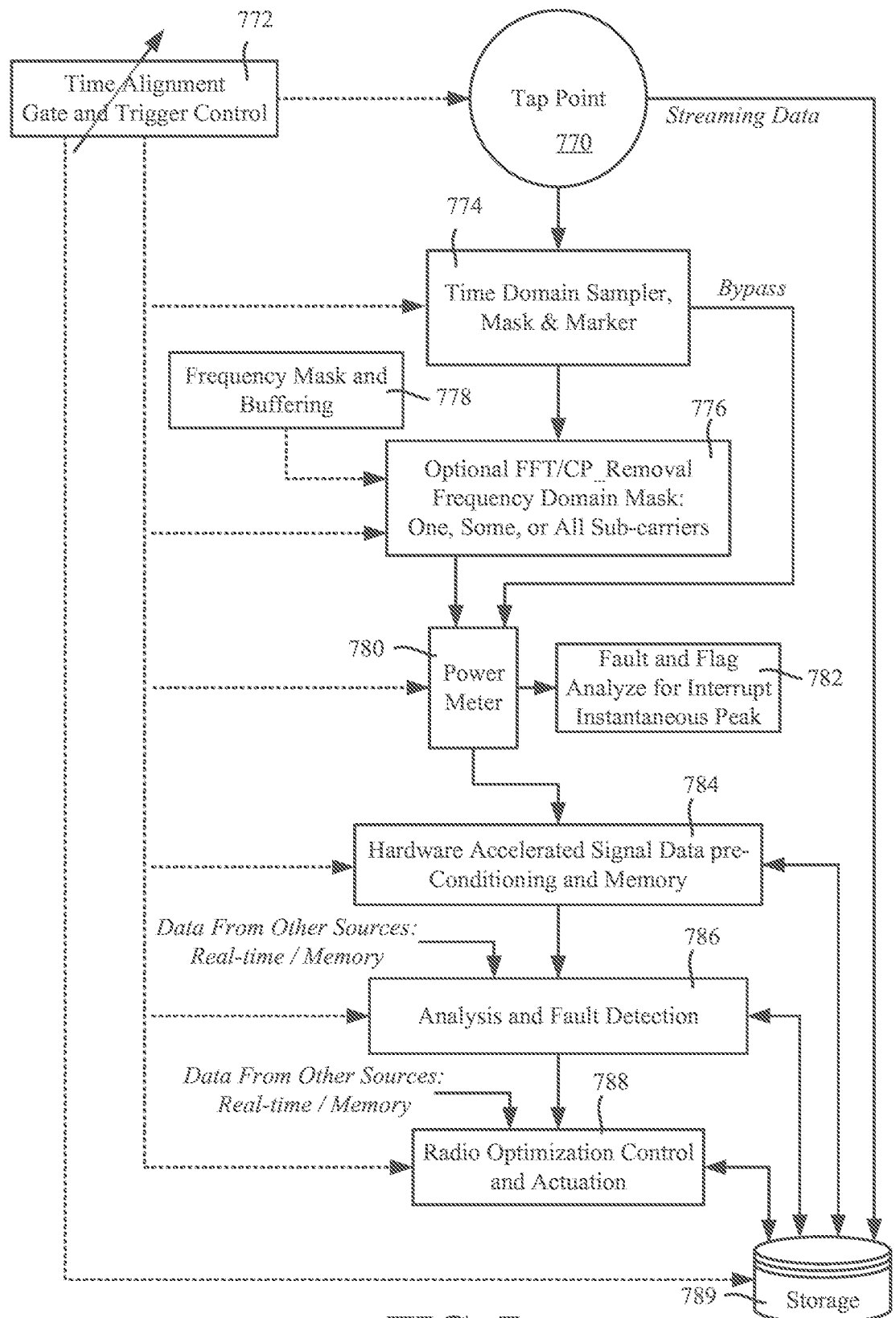
FIG. 7 is a block diagram representation of an example time domain tap point for detecting power and hardware acceleration of data preconditioning, in accordance with various aspects and embodiments of the subject disclosure.

As set forth herein, the example system architecture radio unit 400 can facilitate signal injection at radio tap points at various locations, including, but not limited to, before any digital front end block(s), before digital pre-distortion, after digital pre-distortion/before digital-to-analog conversion for signal amplification and transmission, and the like. FIG. 7 shows an example of a time domain tap point 700 coupled to time alignment gate and trigger control 772 and a time domain sampler, mask and marker function 774. Note that this is only one example, and it can be readily appreciated that alternative configurations may not be strictly as shown.

The time domain sampler, mask and marker function 774 is coupled to, but can bypass, an optional FFT/CP_Removal frequency domain mask 776 that can be used to select one, some, or all sub-carriers. Frequency mask and buffering block 778 provides input to the FFT/CP_Removal frequency domain mask 776. A power meter 780, in conjunction block 782, can facilitate a fault and flag analyze for interrupt instantaneous peak operation.

The power meter 780 is coupled to hardware accelerated signal data pre-conditioning and memory component 784, which provides input to analysis and fault detection component 786. This input, which along with any data from other sources (real-time data/memory sources), results in output that can be used for radio optimization control and actuation (block 788). Note that radio optimization control and actuation can also use data obtained from any other sources (real-time data/memory sources). Further note that storage 789 is coupled to time alignment 772 and for streaming data of the tap point 770, and is read/write accessible to the hardware accelerated signal data pre-conditioning and memory component 784, the analysis and fault detection component 786 and the radio optimization control and actuation function (block 788).

Figure 8:
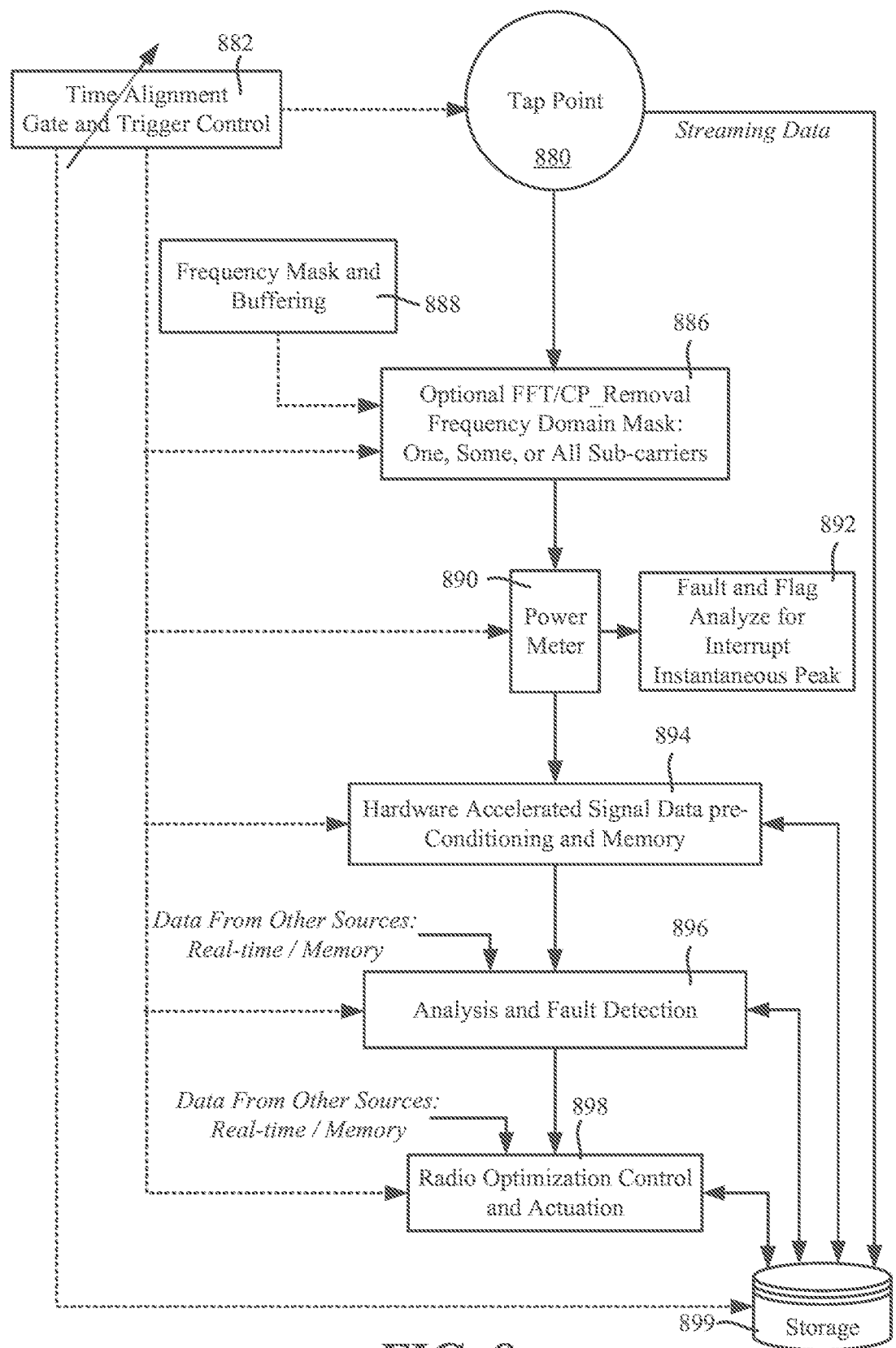
FIG. 8 is a block diagram representation of an example frequency domain source or tap point for detecting power and hardware acceleration of data preconditioning, in accordance with various aspects and embodiments of the subject disclosure.

FIG. 8 shows similar components to that of FIG. 7 for a frequency domain source or tap point 880. The components of/associated with the frequency domain source or tap point 880 are not described again for purposes of brevity, except to note that there is not a similar time domain sampler, mask and marker component (774, FIG. 7) for the frequency domain tap point of FIG. 8, and thus no bypass of FFT/CP_Removal frequency domain mask 886. Notwithstanding, use of the FFT/CP_Removal frequency domain mask 886 is optional.

Figure 9:
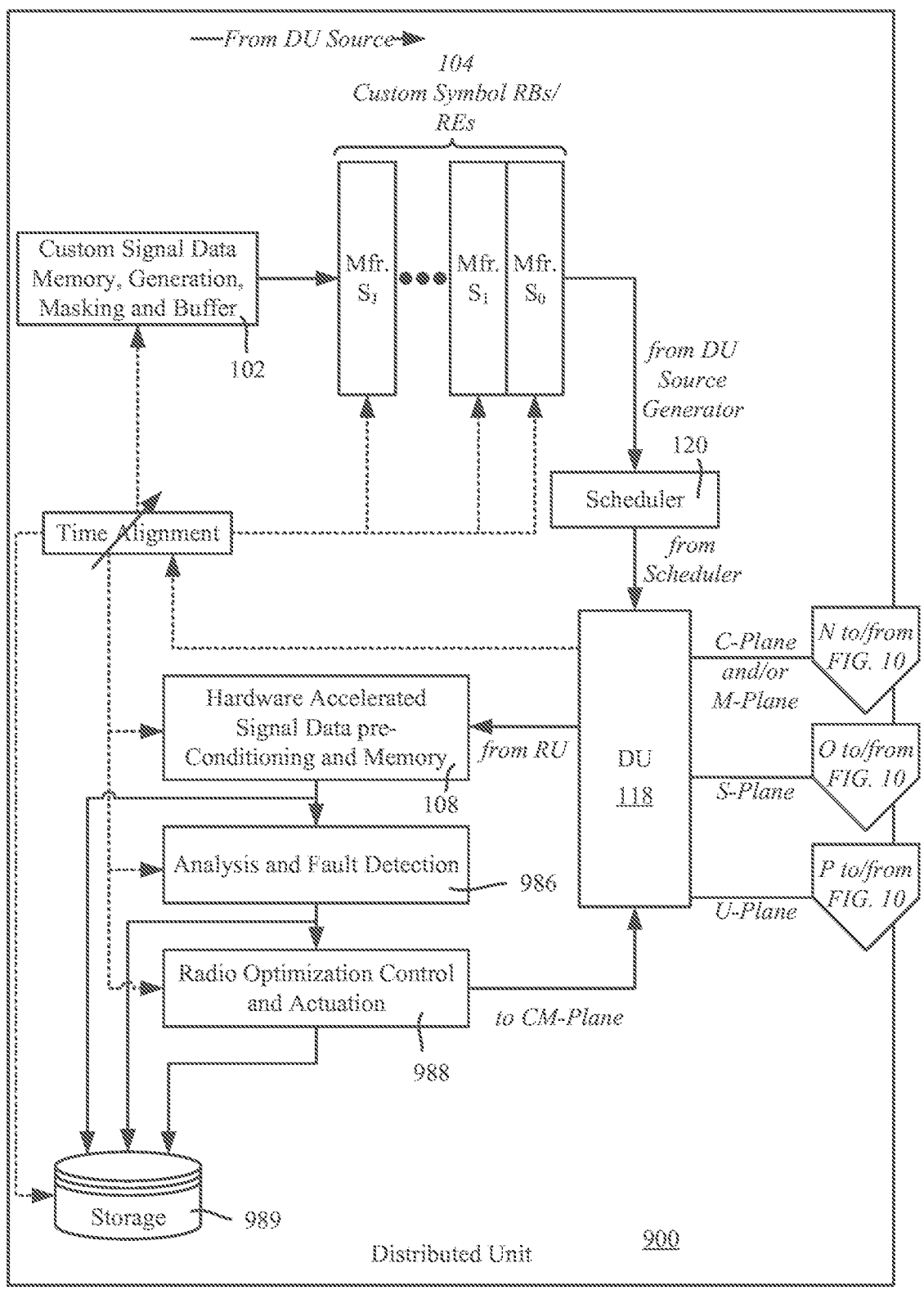
FIGS. 9-12 comprise a block diagram representation of an example system in which a distributed unit (FIG. 9) terminates communicates with a radio unit (FIGS. 10-12), in accordance with various aspects and embodiments of the subject disclosure.

FIGS. 9-12 illustrate an example system architecture 200 for a distributed unit 900 (FIG. 9) and a radio unit 1000 (FIGS. 10-12) that can facilitate signal injection at radio tap points, in accordance with an embodiment of this disclosure. The components of FIG. 9 have been mostly described with reference to FIG. 1 and are not described again for purposes of brevity, except to note that the distributed unit 900 of FIG. 9 depicts Analysis and Fault Detection 986, Radio Optimization Control and Actuation 988 and storage 989, which are generally described with reference to FIGS. 2 and 3.

Figure 10:
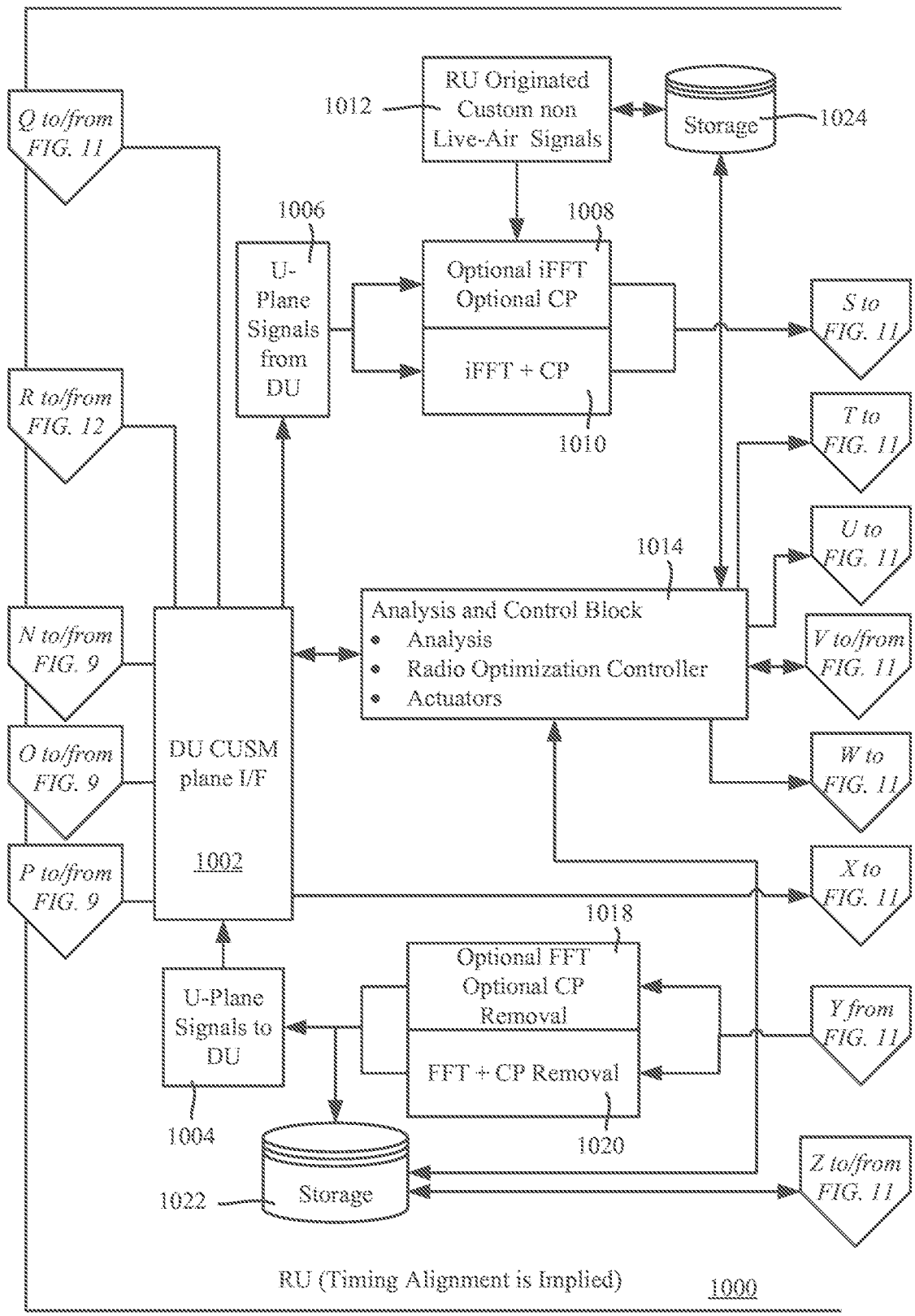
Figure 11:
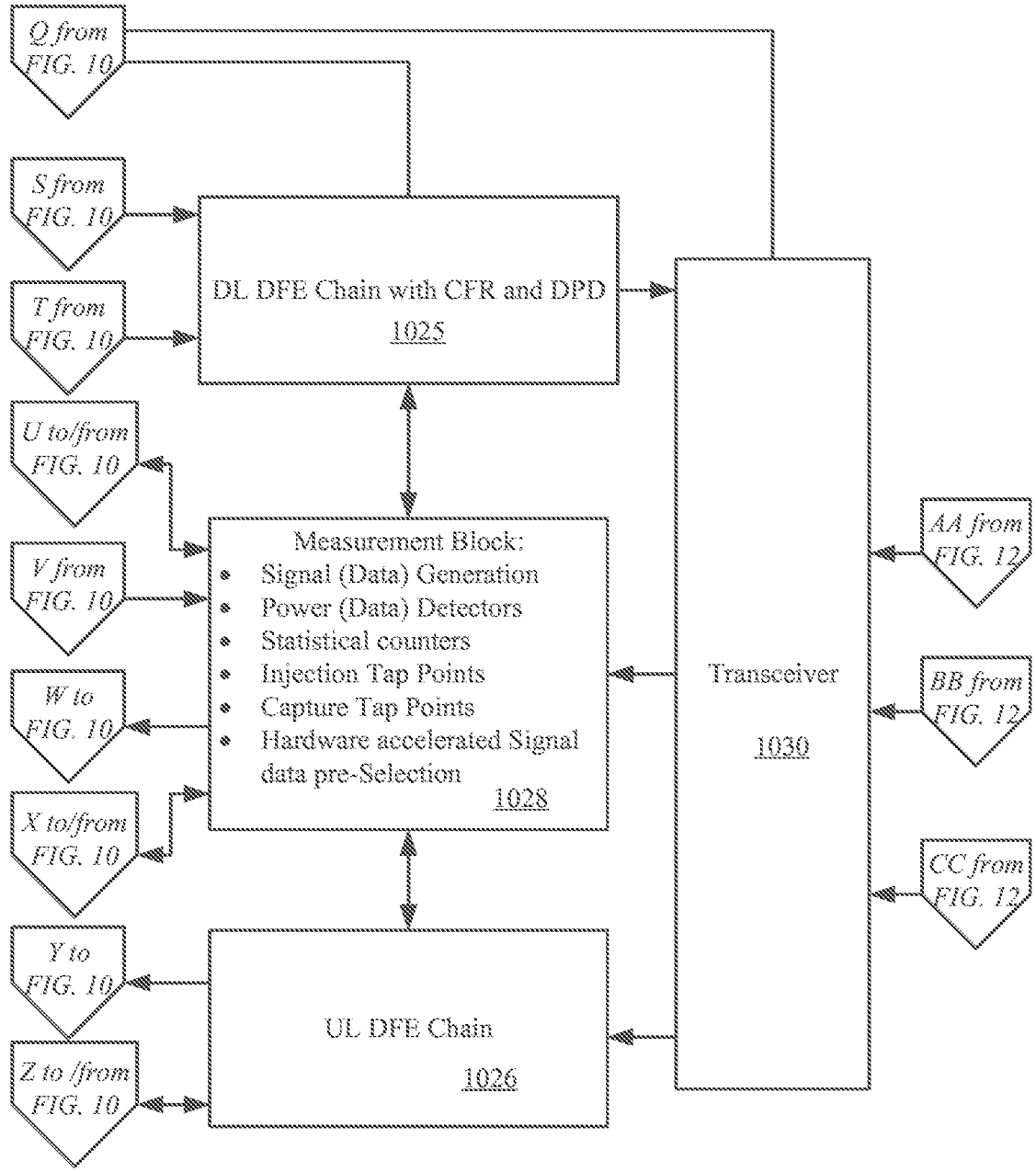
Figure 12:
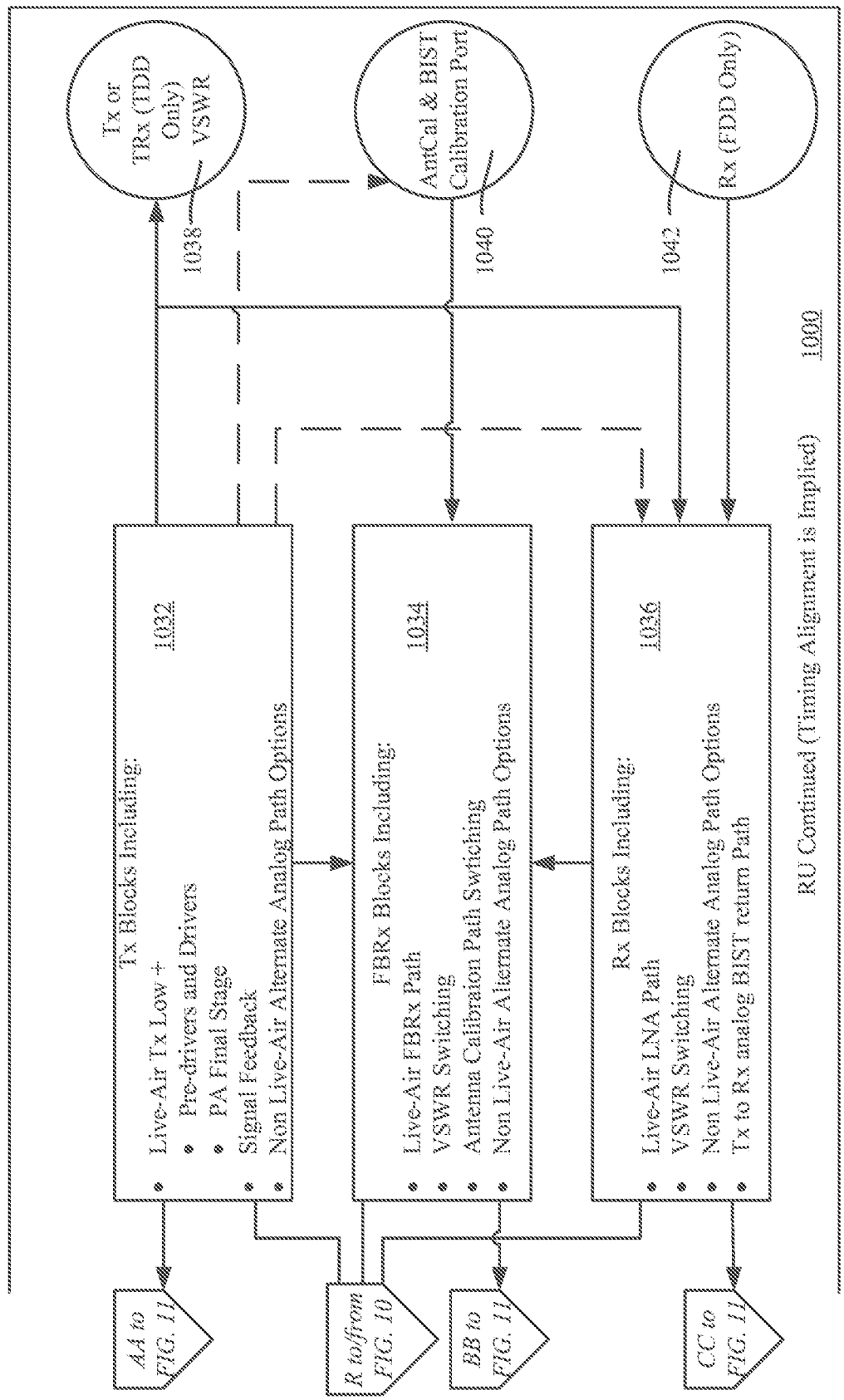

FIGS. 10-12 depict the radio unit 1000 part of the system architecture, which can include a downlink chain and an uplink signal chain as depicted in FIG. 11. Timing alignment as described above is implied in FIGS. 10-12.

As shown in FIG. 10, the radio 1000 comprises distributed unit (DU) control user synchronization management (CUSM) plane interface (I/F) 1002, live-air (user-plane) traffic signals 1004 from the DU 900, live-air (user-plane)

traffic signals to DU 1006, optional iFFT and CP 1008, iFFT and CP 1010, and RU-originated custom non-live-air traffic signals 1012.

Analysis and control block 1014 provides for analysis, and includes a radio optimization controller and actuators. Also depicted is optional FFT and optional CP removal 1018 and FFT and CP removal 1020. Storage 1022 and storage 1024 are also shown in FIG. 10.

The example radio unit 1000 continues at FIG. 11, and includes a downlink (DL) DFE chain 1025 uplink (UL) DFE chain 1026, measurement block 1028 and transceiver 1030. The DL DFE chain 1025 can include CFR and DPD as described herein. The measurement block 1028 can comprise signal (data) generation, power (data) detectors, statistical counters, injection tap points, capture tap points, and/or hardware accelerated signal data pre-selection.

In the radio unit 1000 part of the system architecture, custom signals can be generated and then injected into tap points in either a downlink chain 1025 or an uplink chain 1026. Custom signals can be generated at RU originated custom non-live-air traffic signals 1012, and in some examples, combined with live-air traffic signals 1006 from the DU 900. The resulting signal can be injected into various parts of the DL DFE chain 1025 (via optional iFFT/optional CP 1008) or UL DFE chain 1026 via tap points of measurement block 1028.

The example radio unit 1000 also continues at FIG. 12, which depicts transmission (Tx) blocks 1032, feedback receiver (FBRx) blocks 1034, and receiver (Rx) blocks 1036, The Tx blocks 1032 can include Tx low, pre-drivers and drivers, power amplifier (PA, final stage), signal feedback, and non-live-air traffic alternate analog path options. The FBRx blocks 1034 can include a live-air traffic FBRx path, voltage standing wave ratio (VSWR) mode switching, and non-live-air traffic alternate analog path options. The Rx blocks 1036 can include a live-air traffic low noise amplifier (LNA) path, VSWR switching, and non-live-air traffic analog path options. Also shown are Tx or transceiver (TRx) port 1038, and antenna calibration (AntCal) and built-in self-test (BIST) calibration port 1040. The Rx 1042 can include a separate port for the case of frequency-division duplexing (FDD) radio architectures.

Figure 13:
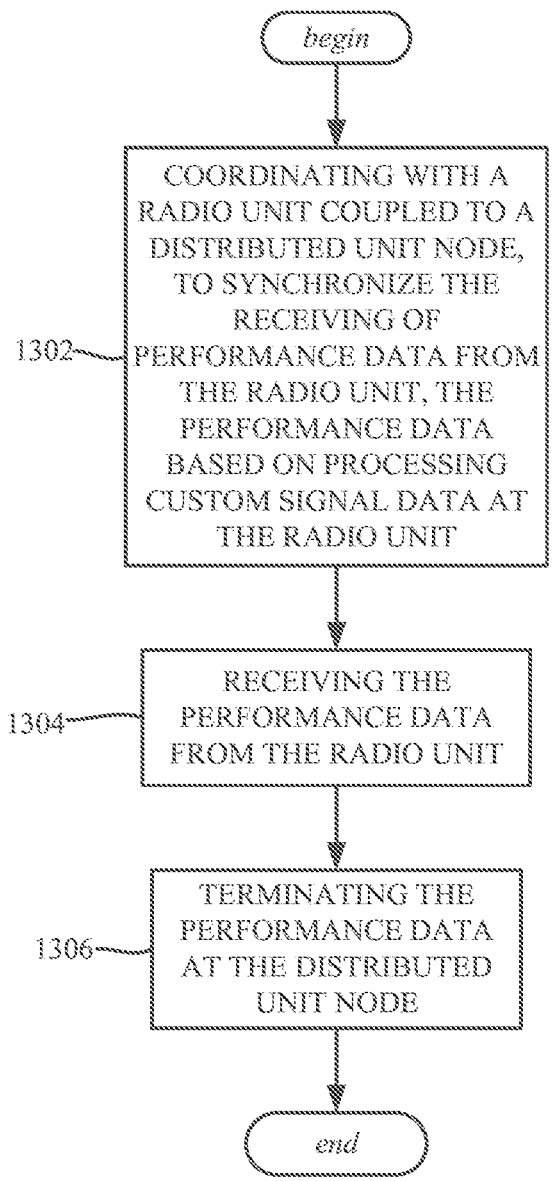
FIG. 13 is a flow diagram representing example operations related to coordinating with a radio unit to synchronize the receiving of performance data from the radio unit for terminating at a distributed unit node, in accordance with various aspects and embodiments of the subject disclosure.

One or more aspects can be embodied in a distributed unit node of a wireless communications network, such as represented in FIG. 13, and for example can comprise a memory that stores computer executable components and/or operations, and a processor that executes computer executable components and/or operations stored in the memory. Example operations can comprise operation 1302, which represents coordinating with a radio unit coupled to the distributed unit node, to synchronize the receiving of performance data from the radio unit, the performance data based on processing custom signal data at the radio unit. Example operation 1304 represents receiving the performance data from the radio unit. Example operation 1306 represents terminating the performance data at the distributed unit node.

The distributed unit node can inject the custom signal data into a downlink communications path to the radio unit.

The distributed unit node can inject the custom signal data as a group of respective signals associated with respective alignment data to the radio unit.

The distributed unit node can trigger a test case at the radio unit by which the radio unit generates the performance data.

Coordinating with the radio unit can include providing performance test information, comprising knowledge of a reference signal and timing data, to configure the radio unit for a performance test, transmitting the reference signal to the radio unit to trigger the performance test based on the reference signal to generate the performance data, and communicating with the radio unit for the receiving the performance data from the radio unit.

Further operations can include determining selected uplink path resources based on usage data of the uplink path resources, and wherein the coordinating with the radio unit to synchronize the receiving of the performance data comprises scheduling the radio unit to return the performance data via the selected uplink path resources.

Terminating the performance data at the distributed unit node can include analyzing the performance data at the distributed unit node.

Further operations can include determining, based on the analyzing the performance data, a modified operating state of the radio unit, and instructing the radio unit to activate the modified operating state.

Further operations can include generating control information associated with the radio unit, based on the analyzing the performance data, and communicating the control information to the radio unit via control messaging.

Further operations can include generating control information, based on the analyzing the performance data, and communicating the control information to the radio unit via opportunistic communications.

Further operations can include storing the performance data at a storage resource coupled to the distributed unit node.

Further operations can include obtaining a copy of the performance data from the storage resource, and processing the copy of the performance data for subsequent analysis.

Figure 14:
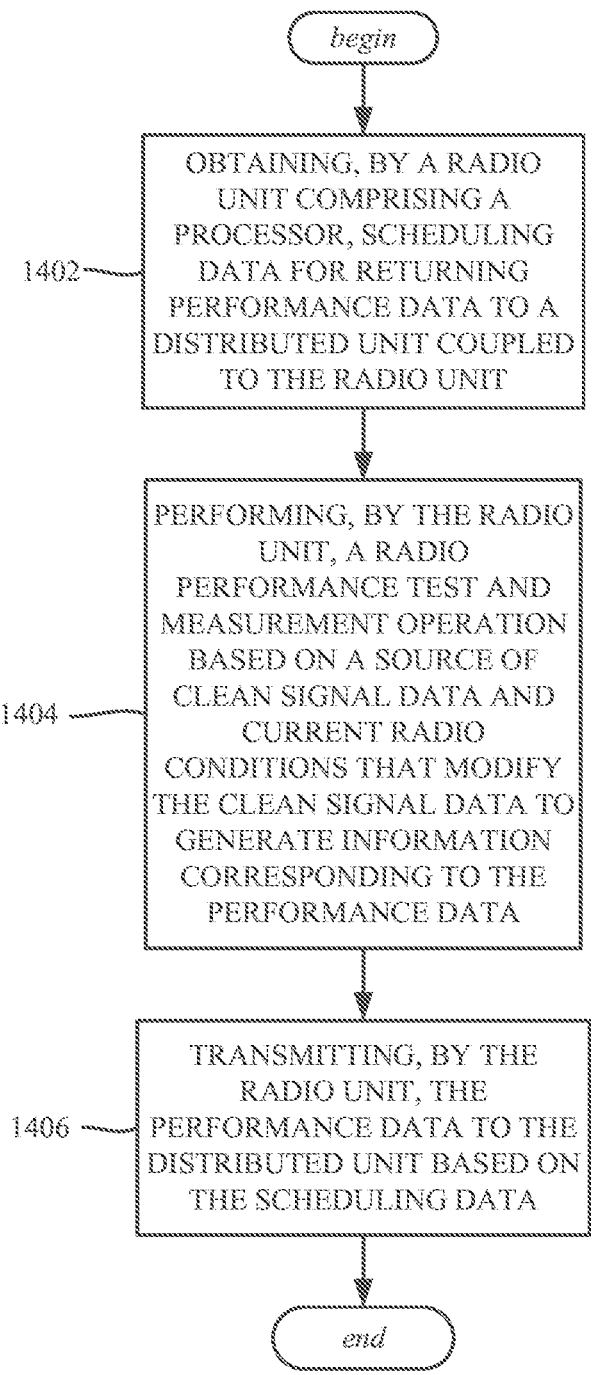
FIG. 14 is a flow diagram representing example operations related to a radio unit performing a test and measurement operation for returning performance data to a distributed unit, in accordance with various aspects and embodiments of the subject disclosure.

One or more aspects can be embodied in a method, such as represented in FIG. 14. Example operations can comprise operation 1402, which represents obtaining, by a radio unit comprising a processor, scheduling data for returning performance data to a distributed unit coupled to the radio unit. Operation 1404 represents performing, by the radio unit, a radio performance test and measurement operation based on a source of clean signal data and current radio conditions that modify the clean signal data to generate information corresponding to the performance data. Operation 1406 represents transmitting, by the radio unit, the performance data to the distributed unit based on the scheduling data.

Further operations can include receiving, by the radio unit, the clean signal data from the distributed unit.

Further operations can include originating, by the radio unit, the clean signal data, and transmitting information representative of the clean signal data from the radio unit to the distributed unit.

Further operations can include modifying, by the radio unit based on the performance data, an operating state of the radio unit from a first operating state to a second operating state.

Modifying the operating state of the radio unit from a first operating state to a second operating state can include receiving modification data from the distributed unit based on processing of the performance data by the distributed unit.

Figure 15:
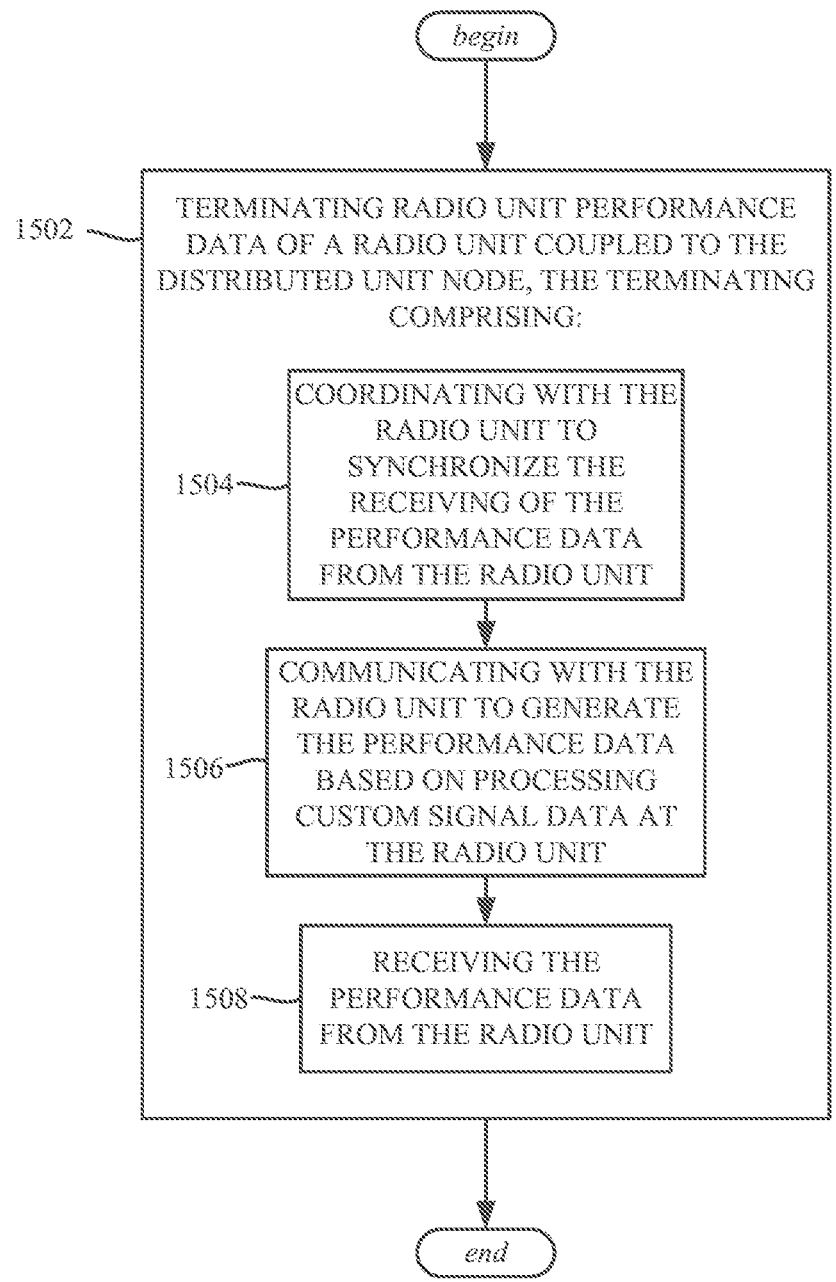
FIG. 15 is a flow diagram representing example operations related to terminating performance data, obtained by a radio unit based on custom signal data, at a distributed unit node that coordinates and communicates with the radio unit, in accordance with various aspects and embodiments of the subject disclosure.

FIG. 15 summarizes various example operations, e.g., corresponding to a machine-readable storage medium, comprising executable instructions that, when executed by a processor of a distributed unit node, facilitate performance of operations. Operation 1502 represents terminating radio unit performance data of a radio unit coupled to the distributed unit node. The terminating can include coordinating with the radio unit to synchronize the receiving of the performance data from the radio unit (operation1504), communicating with the radio unit to generate the performance data based on processing custom signal data at the radio unit (operation1506), and receiving the performance data from the radio unit (operation1508).

Further operations can include determining, based on the performance data, a modified operating state of the radio unit, and communicating with the radio unit to change an existing operating state of the radio unit to the modified operating state.

Further operations can include injecting the custom signal data into a communications path to the radio unit.

As can be seen, the technology described herein terminates, at a distributed unit, performance data, obtained based on custom data injected into a radio unit communications path, to learn information about operation of the radio unit. Based on the performance data, the technology described herein can improve radio unit performance to provide a more beneficial customer experience, as well as, for example, to learn general insights about wireless network devices and overall wireless network operation.

Figure 16:
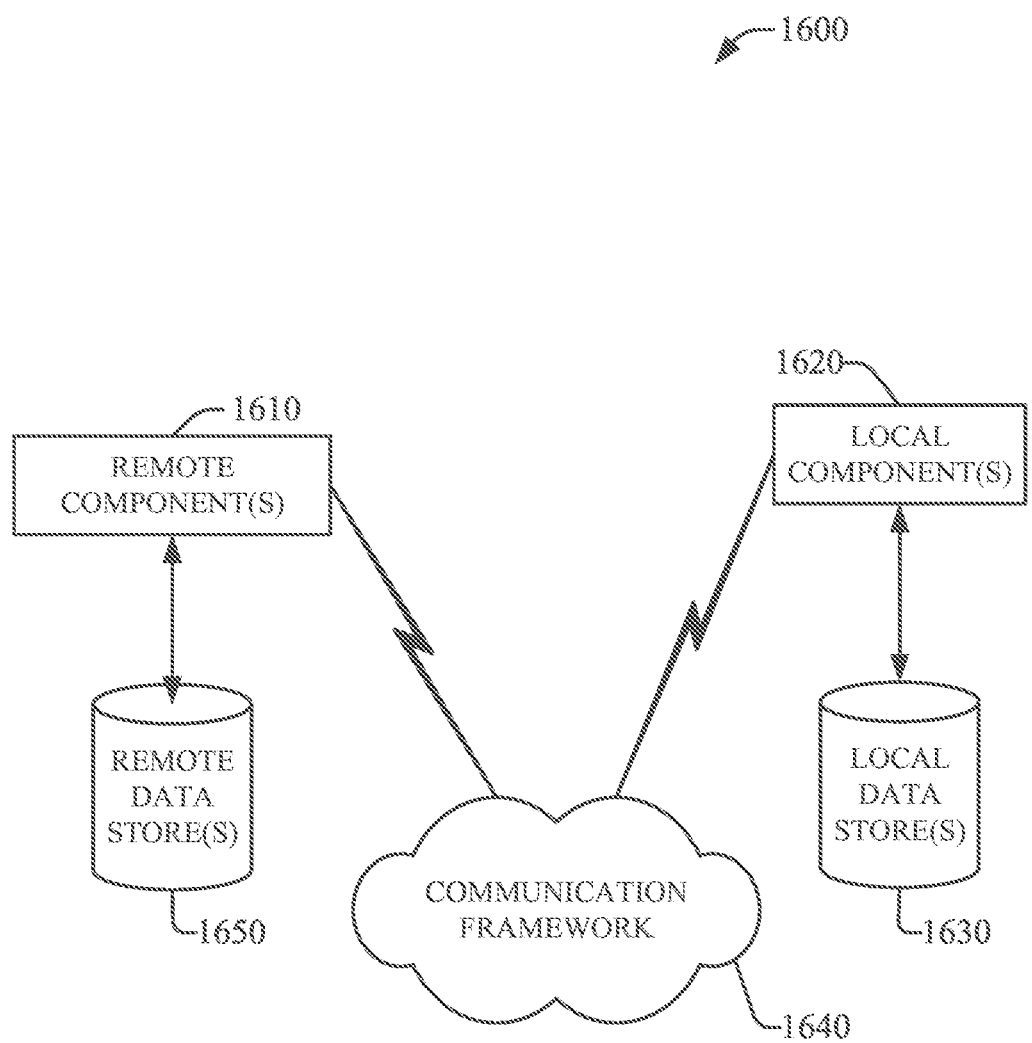
FIG. 16 is a block diagram representing an example computing environment into which aspects of the subject matter described herein may be incorporated.

FIG. 16 is a schematic block diagram of a computing environment 1600 with which the disclosed subject matter can interact and/or be incorporated to an extent. The system 1600 comprises one or more remote component(s) 1610. The remote component(s) 1610 can be hardware and/or software (e.g., threads, processes, computing devices). In some embodiments, remote component(s) 1610 can be a distributed computer system, connected to a local automatic scaling component and/or programs that use the resources of a distributed computer system, via communication framework 1640. Communication framework 1640 can comprise wired network devices, wireless network devices, mobile devices, wearable devices, radio access network devices, gateway devices, femtocell devices, servers, etc.

The system 1600 also comprises one or more local component(s) 1620. The local component(s) 1620 can be hardware and/or software (e.g., threads, processes, computing devices). In some embodiments, local component(s) 1620 can comprise an automatic scaling component and/or programs that communicate/use the remote resources 1610 and 1620, etc., connected to a remotely located distributed computing system via communication framework 1640.

One possible communication between a remote component(s) 1610 and a local component(s) 1620 can be in the form of a data packet adapted to be transmitted between two or more computer processes. Another possible communication between a remote component(s) 1610 and a local component(s) 1620 can be in the form of circuit-switched data adapted to be transmitted between two or more computer processes in radio time slots. The system 1600 comprises a communication framework 1640 that can be employed to facilitate communications between the remote component(s) 1610 and the local component(s) 1620, and can comprise an air interface, e.g., Uu interface of a UMTS network, via a long-term evolution (LTE) network, etc. Remote component(s) 1610 can be operably connected to one or more remote data store(s) 1650, such as a hard drive, solid state drive, SIM card, device memory, etc., that can be employed to store information on the remote component(s) 1610 side of communication framework 1640. Similarly, local component(s) 1620 can be operably connected to one or more local data store(s) 1630, that can be employed to store information on the local component(s) 1620 side of communication framework 1640.

Figure 17:
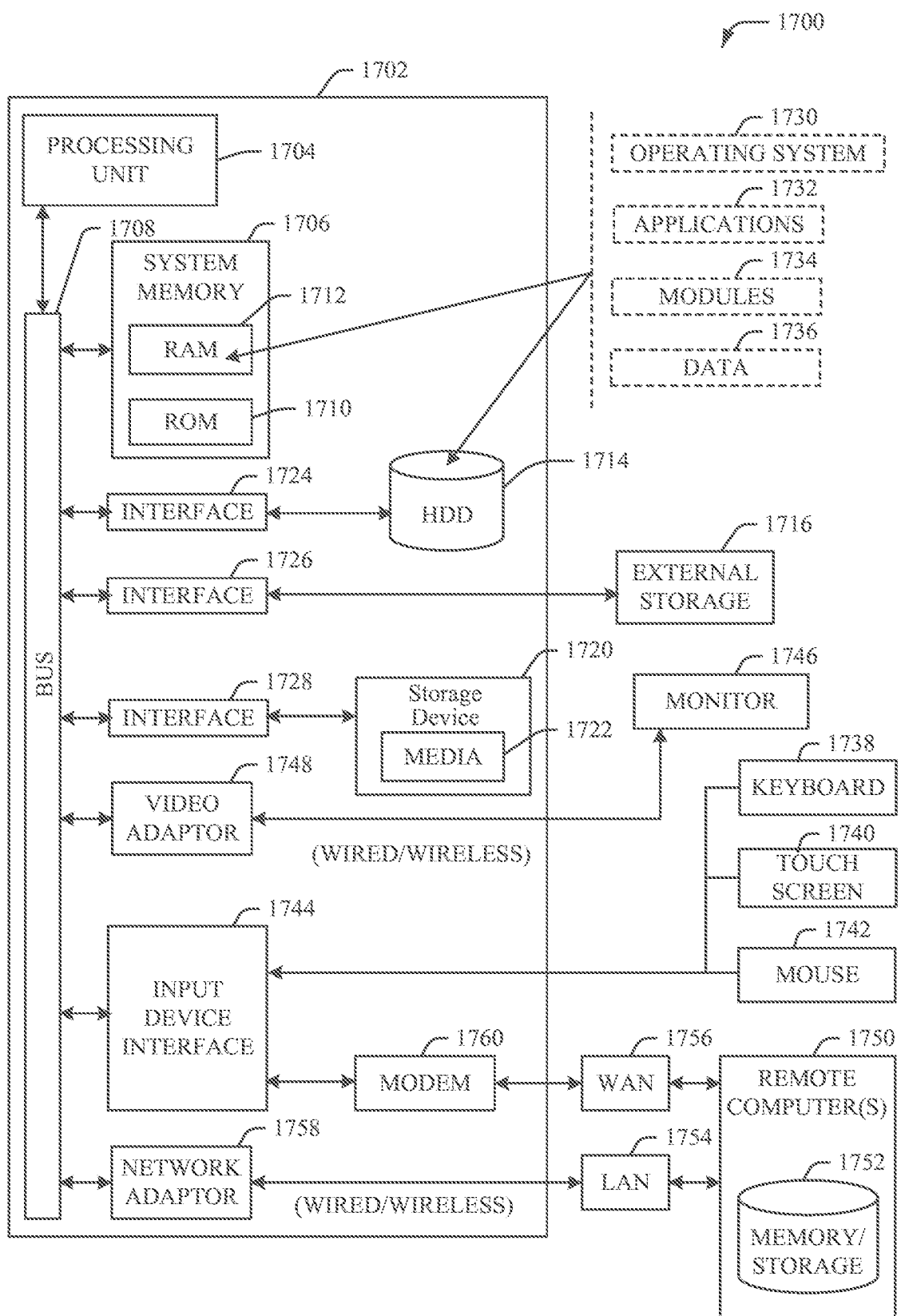
FIG. 17 depicts an example schematic block diagram of a computing environment with which the disclosed subject matter can interact/be implemented at least in part, in accordance with various aspects and implementations of the subject disclosure.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), and can include one or more external storage devices 1716 (e.g., a magnetic floppy disk drive (FDD) 1716, a memory stick or flash drive reader, a memory card reader, etc.). While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714.

Other internal or external storage can include at least one other storage device 1720 with storage media 1722 (e.g., a solid state storage device, a nonvolatile memory device, and/or an optical disk drive that can read or write from removable media such as a CD-ROM disc, a DVD, a BD, etc.). The external storage 1716 can be facilitated by a network virtual machine. The HDD 1714, external storage device(s) 1716 and storage device (e.g., drive) 1720 can be connected to the system bus 1708 by an HDD interface 1724, an external storage interface 1726 and a drive interface 1728, respectively.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enabled with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "gNode B", "O-DU", and "O-RU" and "O-CU" for ORAN, "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a wireless capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A distributed unit node of a wireless communications network, comprising:
   a processor; and
   a memory that stores executable instructions that, when executed by the processor, facilitate performance of operations, the operations comprising:
      coordinating with a radio unit communicatively coupled to the distributed unit node, to synchronize receiving of performance data from the radio unit;
      based on the coordinating, sending a transmission to the radio unit, wherein the transmission comprises custom reference signal data interleaved with at least one of live-air traffic data or non-live-air traffic data for the radio unit;
      receiving, from the radio unit, the performance data generated based on the custom reference signal data;
      terminating the performance data at the distributed unit node, wherein the terminating the performance data at the distributed unit node comprises analyzing the performance data at the distributed unit node;
      determining, based on the analysis of the performance data, a modified operating state of the radio unit; and
      instructing the radio unit to activate the modified operating state.

2. The distributed unit node of claim 1, wherein the distributed unit node injects the custom reference signal data into a downlink communications path to the radio unit.

3. The distributed unit node of claim 1, wherein the distributed unit node injects the custom reference signal data as a group of respective signals associated with respective alignment data to the radio unit.

4. The distributed unit node of claim 1, wherein the custom reference signal data triggers a test case at the radio unit by which the radio unit generates the performance data.

5. The distributed unit node of claim 1, wherein the coordinating with the radio unit comprises providing performance test information, comprising knowledge of the custom reference signal data and timing data, to configure the radio unit for a performance test.

6. The distributed unit node of claim 1, wherein the operations further comprise selecting uplink path resources from a group of uplink path resources based on usage data of the group of uplink path resources, and wherein the coordinating with the radio unit to synchronize the receiving of the performance data comprises scheduling the radio unit to return the performance data via the selected uplink path resources.

7. The distributed unit node of claim 1, wherein the operations further comprise generating control information associated with the radio unit, based on the analysis of the performance data, and communicating the control information to the radio unit via control messaging.

8. The distributed unit node of claim 1, wherein the operations further comprise generating control information, based on the analysis of the performance data, and communicating the control information to the radio unit via opportunistic communications.

9. The distributed unit node of claim 1, wherein the operations further comprise storing the performance data at a storage resource coupled to the distributed unit node.

10. The distributed unit node of claim 9, wherein the operations further comprise obtaining a copy of the performance data from the storage resource, and processing the copy of the performance data for subsequent analysis.

11. A method, comprising:
    obtaining, by a radio unit comprising a processor, scheduling data for returning performance data to a distributed unit coupled to the radio unit;
    receiving, by the radio unit, a transmission from the distributed unit, wherein the transmission comprises custom reference signal data interleaved with at least one of live-air traffic data or non-live-air traffic data for the radio unit;
    performing, by the radio unit, a radio performance test and measurement operation based on the custom reference signal data and current radio conditions that modify the custom reference signal data to generate information corresponding to the performance data;
    transmitting, by the radio unit, the performance data to the distributed unit based on the scheduling data;
    receiving, by the radio unit, modification data from the distributed unit based on processing of the performance data by the distributed unit; and
    modifying, by the radio unit based on the modification data, an operating state of the radio unit from a first operating state to a second operating state.

12. The method of claim 11, wherein the scheduling data specifies the radio performance test and measurement operation selected from a group of radio performance test and measurement operations based upon a defined criterion.

13. The method of claim 11, wherein the scheduling data specifies a subgroup of uplink resources selected from a group of uplink path resources based on usage data of the group of uplink path resources to employ for transmitting the performance data.

14. A non-transitory machine-readable medium, comprising executable instructions that, when executed by a processor of a distributed unit node, facilitate performance of operations, the operations comprising:
    terminating performance data of a radio unit communicatively coupled to the distributed unit node, the terminating comprising:
       coordinating with the radio unit to synchronize the receiving of the performance data from the radio unit,
       based on the coordinating, sending a transmission to the radio unit, wherein the transmission comprises custom reference signal data interleaved with at least one of live-air traffic data or non-live-air traffic data for the radio unit,
       receiving the performance data from the radio unit;
    determining, based on the performance data, a modified operating state of the radio unit; and
    communicating with the radio unit to change an existing operating state of the radio unit to the modified operating state.

15. The non-transitory machine-readable medium of claim 14, wherein the custom reference signal data triggers a test case at the radio unit by which the radio unit generates the performance data.

16. The non-transitory machine-readable medium of claim 14, wherein the distributed unit node injects the custom reference signal data into a downlink communications path to the radio unit.

17. The non-transitory machine-readable medium of claim 14, wherein the distributed unit node injects the custom reference signal data as a group of respective signals associated with respective alignment data to the radio unit.

18. The non-transitory machine-readable medium of claim 14, wherein the coordinating with the radio unit comprises providing performance test information, comprising knowledge of the custom reference signal data and timing data, to configure the radio unit for a performance test.

19. The non-transitory machine-readable medium of claim 14, wherein the operations further comprise selecting uplink path resources from a group of uplink path resources based on usage data of the group of uplink path resources, and wherein the coordinating with the radio unit to synchronize the receiving of the performance data comprises scheduling the radio unit to return the performance data via the selected uplink path resources.

20. The non-transitory machine-readable medium of claim 14, wherein the operations further comprise storing the performance data at a storage resource coupled to the distributed unit node.

* * * * *